July 27, 1965  E. V. GARNETT  3,196,979
WORKMAN'S CAGE OR AERIAL BASKET
Filed Aug. 22, 1961  11 Sheets-Sheet 1

INVENTOR.
EDWARD V. GARNETT
BY
Horace B. Van Valkenburgh
ATTORNEY

July 27, 1965  E. V. GARNETT  3,196,979
WORKMAN'S CAGE OR AERIAL BASKET
Filed Aug. 22, 1961  11 Sheets-Sheet 2
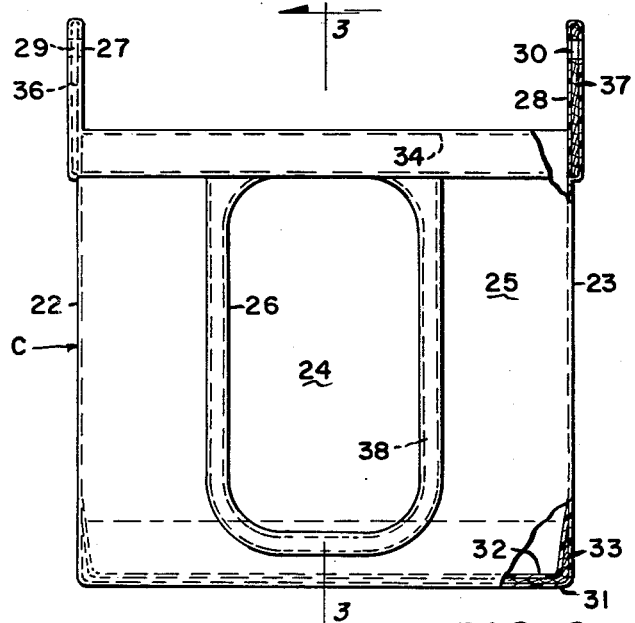
FIG. 2.
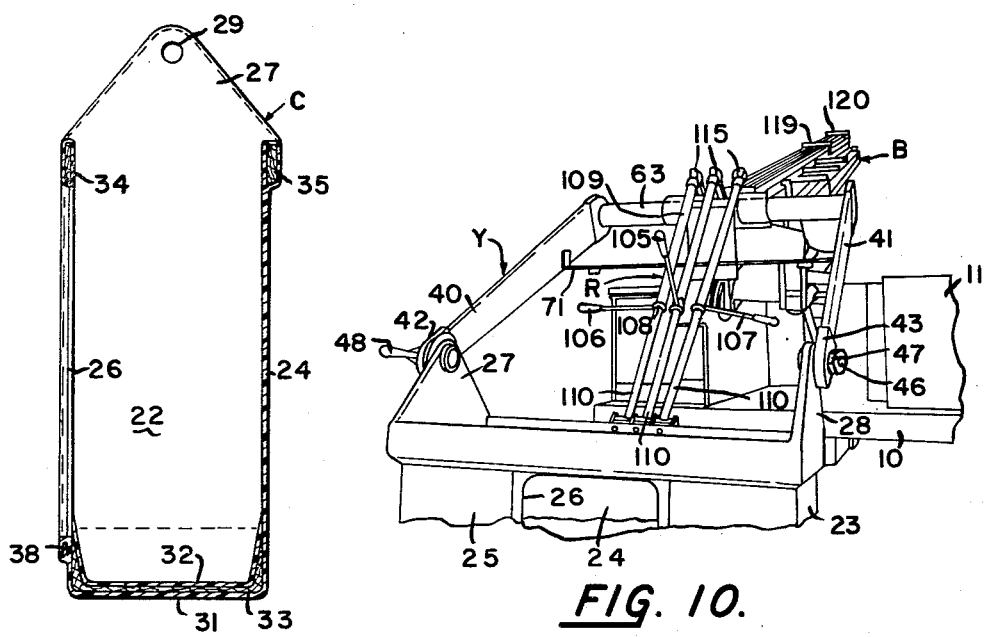
FIG. 3.
FIG. 10.
INVENTOR.
EDWARD V. GARNETT
BY
*Horace B. Van Valkenburgh*
ATTORNEY July 27, 1965

E. V. GARNETT 3,196,979

WORKMAN'S CAGE OR AERIAL BASKET

Filed Aug. 22, 1961

INVENTOR.
EDWARD V. GARNETT
BY

ATTORNEY

July 27, 1965  E. V. GARNETT  3,196,979
WORKMAN'S CAGE OR AERIAL BASKET
Filed Aug. 22, 1961  11 Sheets-Sheet 4

INVENTOR.
EDWARD V. GARNETT
BY
Horace B. Van Valkenburgh
ATTORNEY

July 27, 1965  E. V. GARNETT  3,196,979
WORKMAN'S CAGE OR AERIAL BASKET
Filed Aug. 22, 1961  11 Sheets-Sheet 5

INVENTOR.
EDWARD V. GARNETT
BY
ATTORNEY

July 27, 1965  E. V. GARNETT  3,196,979
WORKMAN'S CAGE OR AERIAL BASKET
Filed Aug. 22, 1961  11 Sheets-Sheet 6
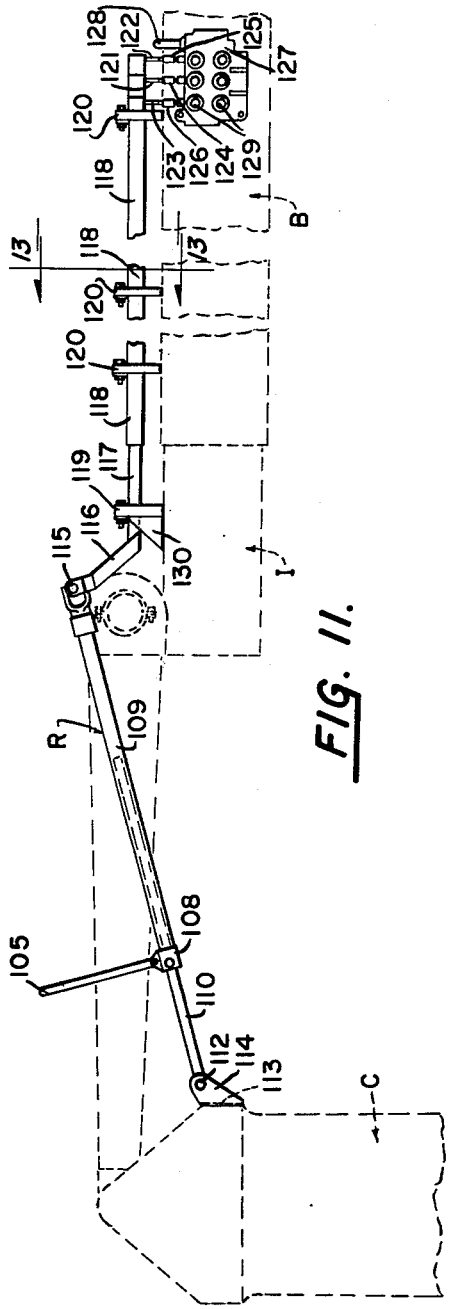
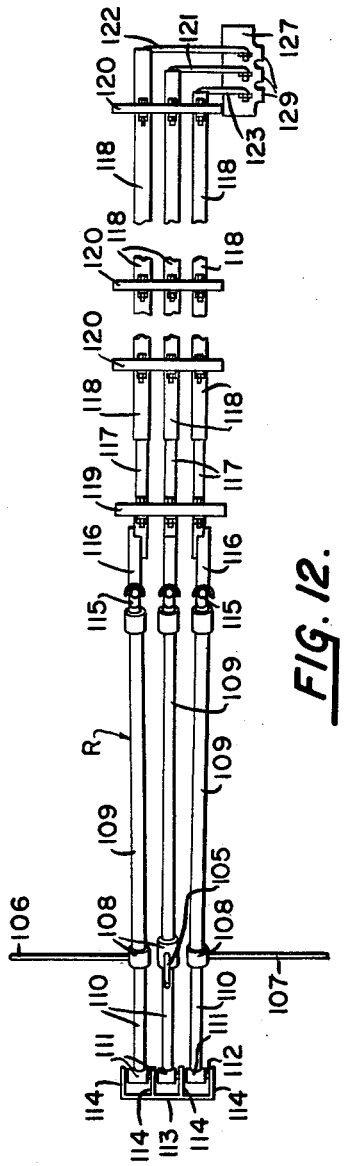
INVENTOR.
EDWARD V. GARNETT
BY
*Horace B. Van Valkenburgh*
ATTORNEY July 27, 1965  E. V. GARNETT  3,196,979
WORKMAN'S CAGE OR AERIAL BASKET
Filed Aug. 22, 1961  11 Sheets-Sheet 7

INVENTOR.
EDWARD V. GARNETT
BY
ATTORNEY

July 27, 1965         E. V. GARNETT         3,196,979
WORKMAN'S CAGE OR AERIAL BASKET
Filed Aug. 22, 1961                 11 Sheets-Sheet 8

INVENTOR.
EDWARD V. GARNETT
BY
ATTORNEY

July 27, 1965 E. V. GARNETT 3,196,979
WORKMAN'S CAGE OR AERIAL BASKET
Filed Aug. 22, 1961 11 Sheets-Sheet 9

INVENTOR.
EDWARD V. GARNETT
BY
Horace B. Van Valkenburgh
ATTORNEY

July 27, 1965     E. V. GARNETT     3,196,979
WORKMAN'S CAGE OR AERIAL BASKET
Filed Aug. 22, 1961     11 Sheets-Sheet 10
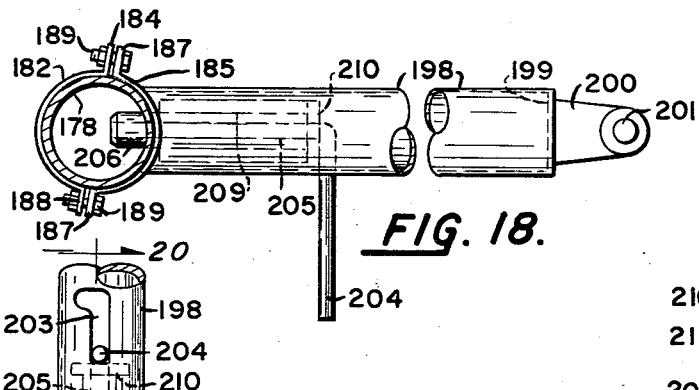
FIG. 18.
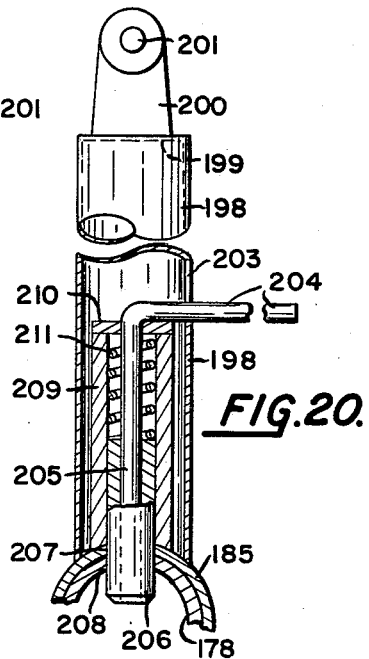
FIG. 20.
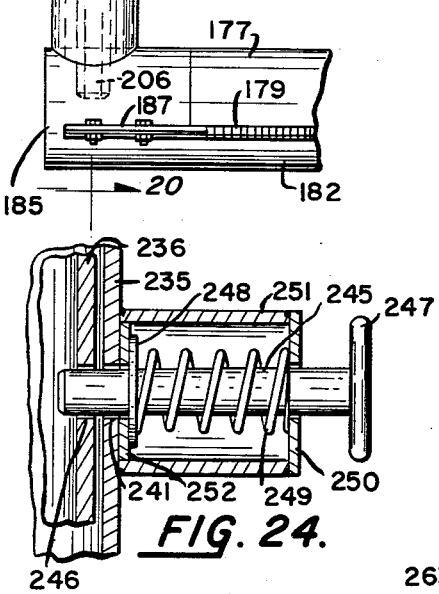
FIG. 19.
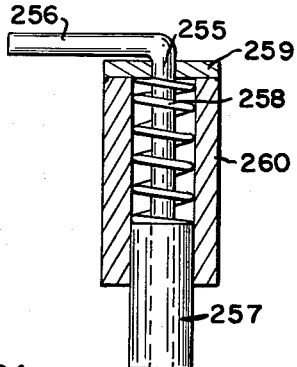
FIG. 25.
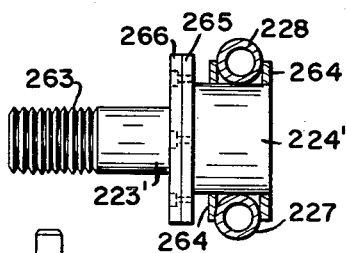
FIG. 24.
FIG. 26.
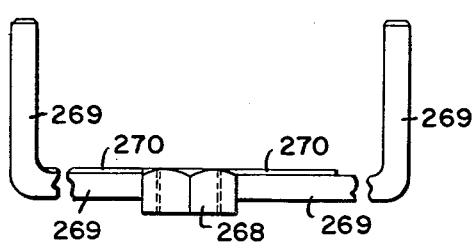
FIG. 27.
INVENTOR.
EDWARD V. GARNETT
BY
Horace B. Van Valkenburgh
ATTORNEY

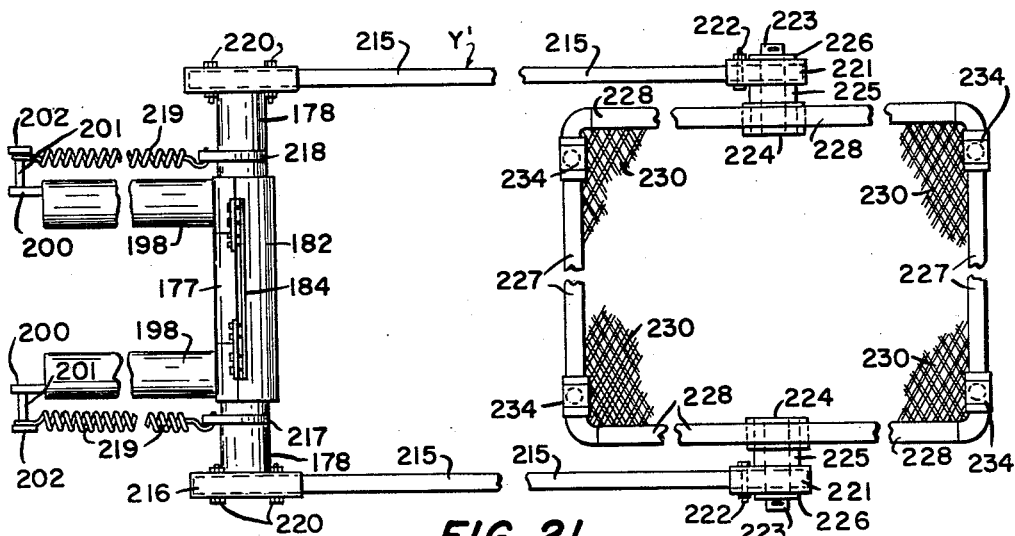
FIG. 21.
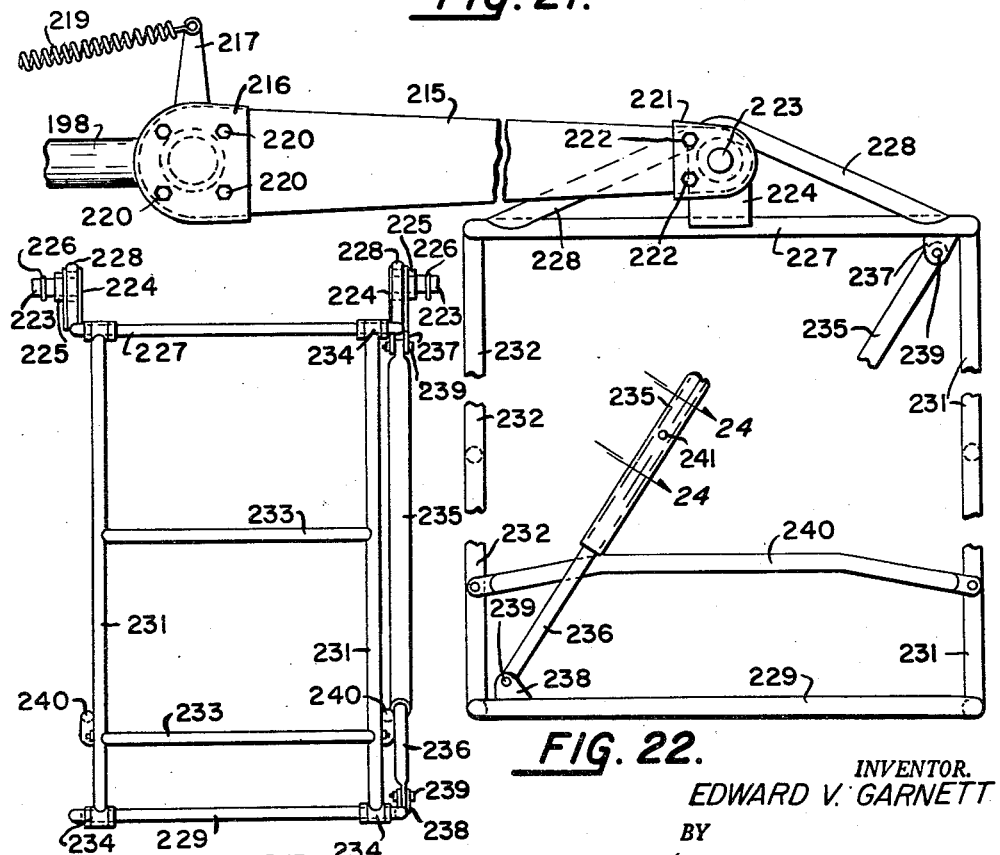
FIG. 22.
FIG. 23.
INVENTOR.
EDWARD V. GARNETT
BY
Horace B. Van Valkenburgh
ATTORNEY 3,196,979
WORKMAN'S CAGE OR AERIAL BASKET
Edward V. Garnett, Denver, Colo., assignor to Eaton Metal Products Company, a corporation of Nebraska
Filed Aug. 22, 1961, Ser. No. 133,116
25 Claims. (Cl. 182—2)

This invention relates to a workman's cage or aerial basket, and more particularly to a cage or basket especially adapted to be mounted on a derrick on a vehicle, such as a truck, to provide a portable unit. This application is a continuation-in-part of my copending application Ser. No. 731,485, filed April 28, 1958, now Patent No. 3,056,510.

It is desirable to provide a basket or cage for use in high places, as by mounting on a derrick and which may be stored with the derrick atop a vehicle, but which will occupy a minimum amount of space when stored. It is also desirable to enable linemen, electricians and the like to work in such a cage or basket, which therefore must be made of insulated material so as to minimize the danger from high current or voltage. Another desirable feature is a remote control system so that the workman in the basket can operate the derrick at his will.

Among the objects of the present invention are to provid a novel cage or basket for workmen which is adapted to be mounted upon a derrick, particularly a derrick for vehicles; to provide a cage or basket which may be readily attached to and detached from a derrick; to provide a cage or basket which, in one form of this invention, is made from fibreglass and resin and is adapted to withstand 50,000 volts, dry flash-over; to provide a cage or basket construction, in another embodiment, which may be folded into a storage position and will lie flat atop a vehicle, such as when a derrick is moved to storage position, without unduly increasing the amount of space occupied by the derrick; to provide a workman's cage or basket which may be locked in closed position atop the vehicle and the derrick; to provide a cage or basket which may be locked in open position on the derrick; to provide a cage or basket which is of simple construction and light in weight; to provide controls for operating the derrick from either the basket or the vehicle; and to provide controls for operating the derrick which are easy to reach from the basket and are simple to use.

Additional objects and the novel features of this invention will become apparent from the description which follows, taken in conjunction with the accompanying drawings, in which:

FIG. 2 is an enlarged front elevation of the aerial basket or cage of FIG. 1, with certain parts broken away for clarity of illustration;

FIG. 3 is a vertical section taken along line 3—3 of FIG. 2;

FIG. 10 is a rear perspective view of the basket lowered behind the truck, showing the remote controls for operating the basket;

FIG. 11 is a condensed side elevation, showing details of the remote controls of FIG. 10, with the basket and boom shown in dotted lines;

FIG. 12 is a condensed top plan view of the controls of FIG. 11;

FIG. 18 is a condensed side elevation, on a slightly enlarged scale, of the supporting assembly of FIG. 17;

FIG. 19 is a fragmentary bottom plan view of a portion of the supporting assembly of FIGS. 17 and 18;

FIG. 20 is an enlarged condensed section, taken along line 20—20 of FIG. 19;

FIG. 21 is a condensed top plan view of the workman's cage or basket when in position for use, as shown in dotted lines in FIG. 15;

FIG. 22 is a condensed side elevation of the basket of FIG. 21;

FIG. 23 is a front elevation, on a reduced scale, of the basket of FIG. 21, with the supporting arms omitted for clarity of illustration;

FIG. 24 is an enlarged fragmentary section taken along line 24—24 of FIG. 22, showing a locking bolt which may be used to hold the basket in assembled or use position;

FIG. 25 is a fragmentary section of an alternative locking bolt;

FIG. 26 is a side elevation of certain associated parts, shown in section of an alternative, braking pivot for the basket of FIG. 21; and FIG. 27 is a side elevation of a tensioning nut which may be used in conjunction with the pivot of FIG. 26.

Figure 1:
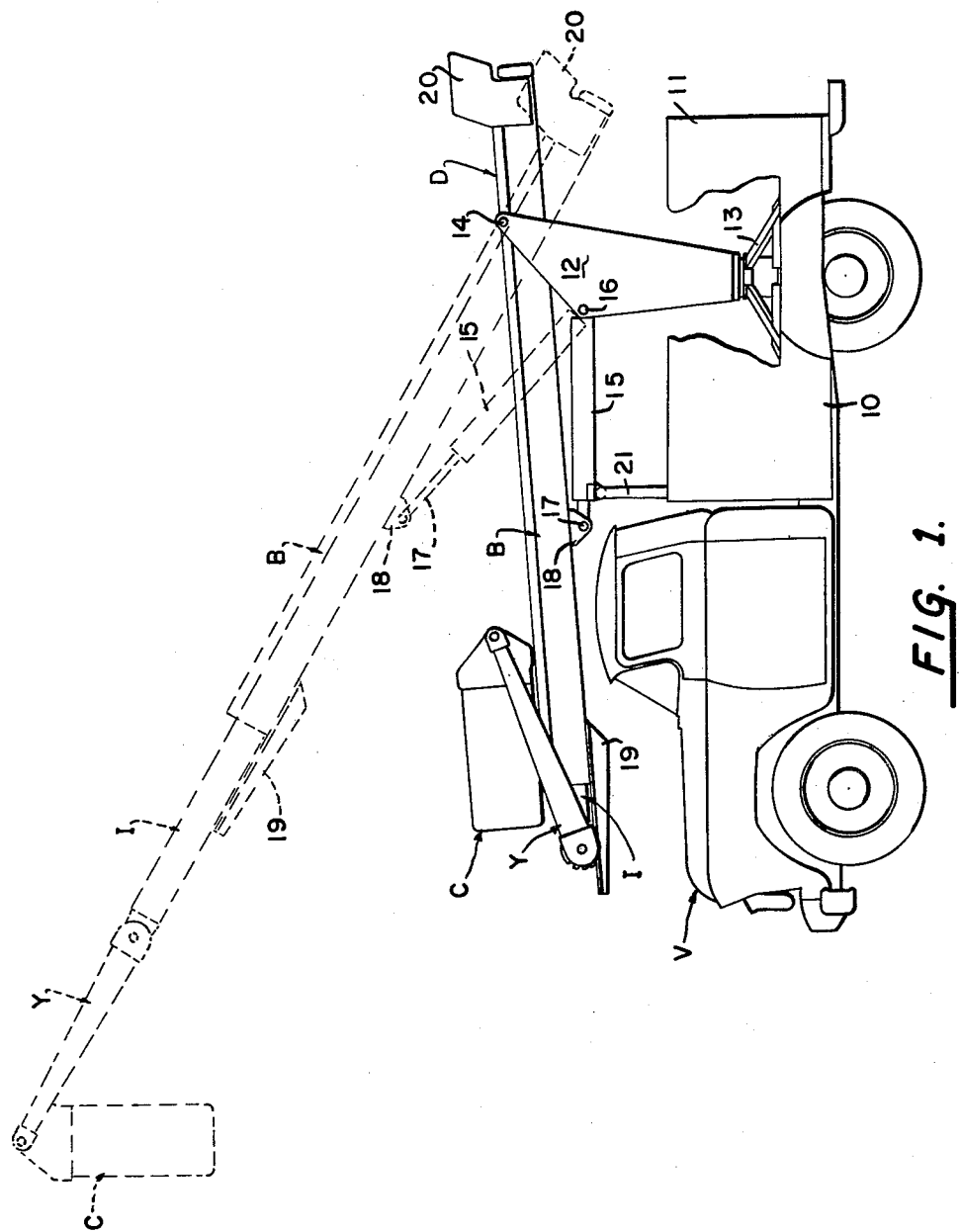
FIG. 1 is a side elevation of a truck equipped with one form of aerial basket or cage of this invention, shown in collapsed or storage position in solid lines and in raised position in dotted lines.

As illustrated in FIG. 1, a vehicle V, such as a truck having a cab, a bed 10 and a low panel body 11, has a derrick D mounted thereon which is equipped with a workman's cage or basket C, constructed in accordance with this invention. The derrick D includes a turret 12 mounted for rotation through 360° upon a pedestal 13 attached to the bed of the truck, a boom B pivoted at the upper end of turret 12 by means of pivot pin 14 and moved up and down by a hydraulic cylinder 15. Turret 12 is conveniently trapezoidal shaped, as shown, with the inner end of hydraulic cylinder 15 pivotally attached to the front corner of turret 12 at a pivot pin 16. A piston rod 17 extends from hydraulic cylinder 15 and its forward end is pivotally connected to a bracket 18 attached to the underside of boom B. Extending forwardly from within the outer boom B, an inner boom I is hydraulically extendable and retractible and serves as a support for cage C, which is pivotally mounted on the outer end thereof by means of a yoke assembly Y. A rack 19 is provided at the outer end of outer boom B, on the underside, to facilitate locking of the cage C in storage position, as will hereinafter appear. At the rear end of outer boom B, a counterweight 20 is conveniently provided, to counterbalance the weight of the extended boom and cage. When the derrick is in storage position, the outer end of hydraulic cylinder 15 rests on an arcuate rest at the top of a tubular support 21 which is mounted atop panel 11 or extends upwardly from bed 10.

Figure 4:
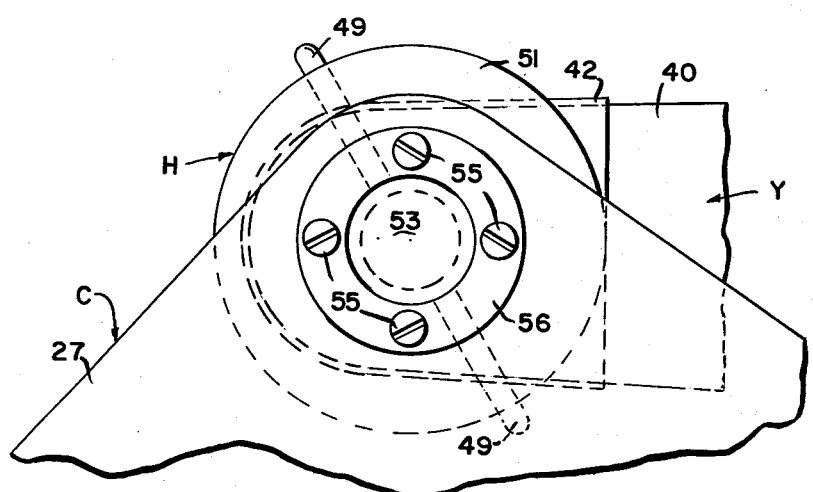
FIG. 4 is an enlarged, fragmentary side elevation of a pivotal connection between the basket and a supporting arm therefor, taken from inside the basket.

The workman's cage C, as in FIGS. 2 and 3, is generally rectangular in shape, having an open top, parallel side walls 22 and 23, a rear wall 24 and a front wall 25 having an opening 26 therein. Extending from the top of the side wall 22 and 23 are a pair of upwardly extending, generally triangular flanges 27 and 28, respectively, each having apertures 29 and 30 for receiving a hinge pin. The basket is formed of fibreglass impregnated with a suitable resin and reinforced with hard wood, plywood or the like. The floor of the basket conveniently comprises an outer or lower fibreglass and resin layer 31 and an inner fibreglass and resin layer 32, between which a reinforcing strip of wood 33 is provided. Conveniently, the wood strip 33 extends upwardly for a short distance into the sides of the basket, as in FIGS. 3 and 4. The upper edge of the front wall 25 is conveniently reinforced by a wood strip 34, completely enclosed in fibreglass and resin, while the upper edge of the rear wall is similarly conveniently reinforced by a wood strip 35, also completely enclosed in fibreglass and resin. Similarly, the flanges 27 and 28 are reinforced by wood panels 36 and 37, while a reinforcing wood strip 38 extends around opening 26 and up to strip 34 at each side, each such reinforcing wood strip or panel being enclosed within the fibreglass and resin, each of the wood strips and panels preferably being formed of hardwood or plywood. As will be evident, the cage or basket C is completely insulated against transmission of current to a workman in the basket, since the fibreglass and resin, as well as the wood, are all electrical insulators. In addition, the opening 26 in the front wall of the basket permits a workman to reach additional points.

Figure 6:
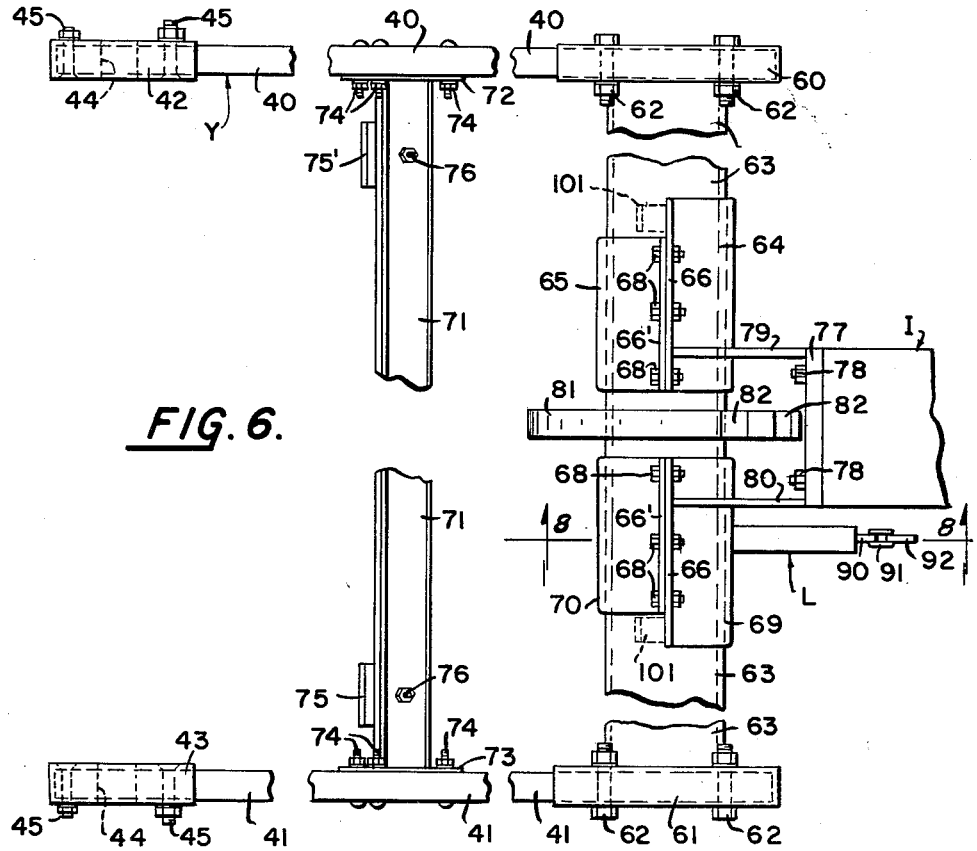
FIG. 6 is a condensed top plan view, on an enlarged scale, of an assembly for supporting the basket.
Figure 7:
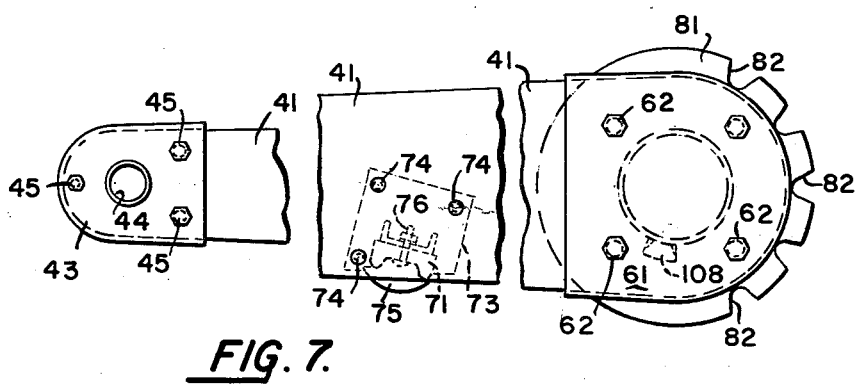
FIG. 7 is a condensed side elevation of the basket supporting assembly of FIG. 6.

As in FIG. 10, the basket or cage C is supported by tapered arms 40 and 41 of the yoke assembly Y, which are conveniently formed of plywood panels covered with fibreglass and resin and provided with reinforcing outer end caps 42 and 43, respectively, as in FIGS. 6 and 7, having holes 44 therethrough and held in place by bolts 45. It is apparent that when the basket is in the position shown in dotted lines in FIG. 1, it may tend to sway or rock on the yoke assembly Y, if the workman leans forwardly or rearwardly from the basket, or under the influence of a strong wind. However, such swinging may be eliminated or reduced by means of a friction hinge which is used at the connection between the yoke assembly Y and the cage C.

Figure 5:
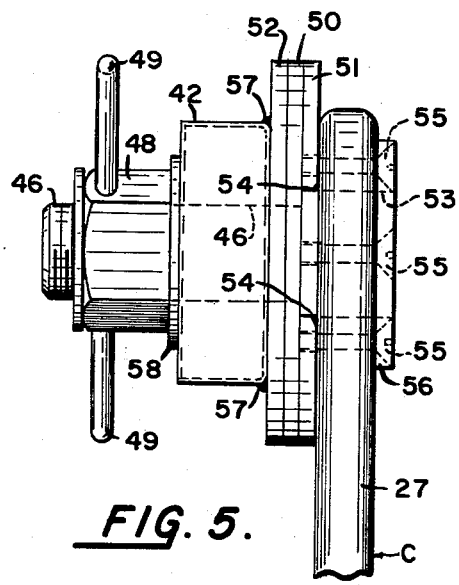
FIG. 5 is a fragmentary end elevation, taken from the left side of FIG. 4.

The basket C, as in FIG. 10, pivots at one side upon a pin 46 threaded at its outer end and extending through the hole in flange 28 and end cap 43 and held in place by a castle nut 47 provided with a cotter pin to hold it in place. Each friction hinge assembly is similar, except on the opposite side a wing nut 48 having handles 49 is utilized to adjust the friction, it being evident that castle nut 47 may be adjusted to provide the desired minimum friction and wing nut 48 adjusted to produce additional friction desired. Thus, as in FIGS. 4 and 5, a friction washer 50, such as formed of brake lining, is disposed between two friction plates 51 and 52, in turn disposed between end cap 42 and flange 27 and surrounding on pin 46. Friction plate 51 is attached to an enlarged head 53 of pin 46, as by welds 54, as shown, and also serves as an anchor for screws 55 which extends through an annular disc 56 and through flange 27 to attach the flange to the pin. The other friction plate 52 is attached to end cap 42, as by means of welds 57, while wing nut 48 bears against a washer 58. As will be evident, by tightening the wing nut 47, the frictional resistance may be increased so that the basket will not swing, and by loosening the wing nut sufficiently, the basket will be permitted to swing to a controlled extent with respect to the arms 40 and 41 of yoke Y.

Figure 9:
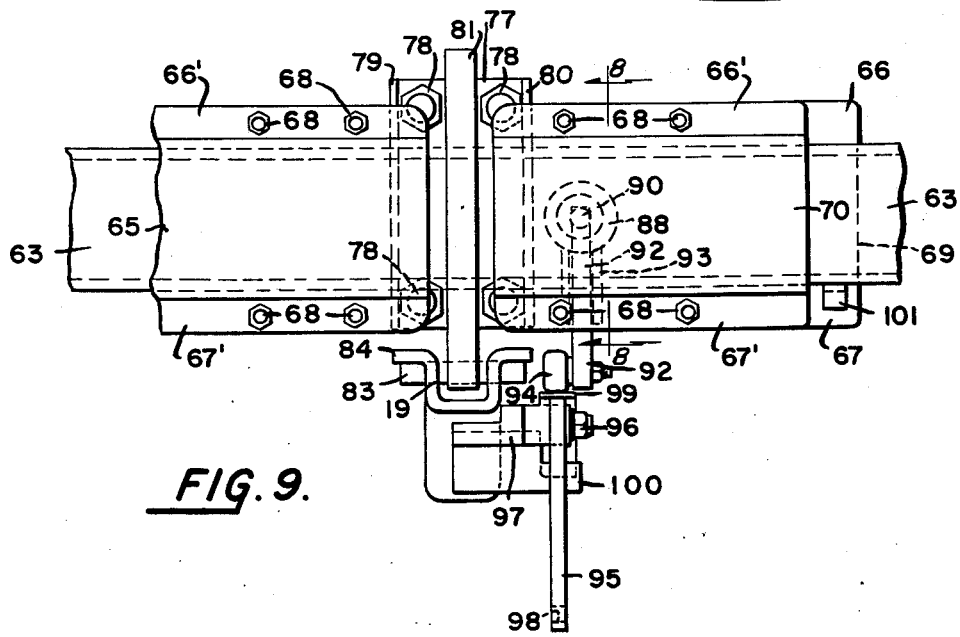
FIG. 9 is a fragmentary front elevation of the locking mechanism of FIG. 8.

The arms 40 and 41 of yoke assembly Y, as in FIGS. 6 and 7, at the inner ends are similarly enclosed by end caps 60 and 61, respectively, which are held in place by means of bolts 62. A tube 63, which serves as an axis about which the yoke Y pivots, extends between end caps 60 and 61 and is attached thereto. The tube 63 is pivotal within two spaced pairs of semicircular bearing plates, one pair comprising an inner bearing plate 64 and an outer bearing plate 65, each having upwardly extending flanges 66 and 66' and downwardly extending flanges 67 and 67', respectively, as in FIGS. 6 and 9, with the opposing flanges of the bearing plates being connected by a plurality of bolts 68. The opposite pair comprises an inner bearing plate 69 and an outer bearing plate 70, similarly having upwardly extending flanges 66 and 66' and downwardly extending flanges 67 and 67', respectively, with the opposing flanges again connected by a plurality of bolts 68. A reinforcing channel 71 is provided intermediate the ends of arms 40 and 41 and is held in place by means of end plates 72 and 73, respectively, which are attached to the arms by bolts 74. As shown in FIG. 7, reinforcing channel 71 is turned at a slight angle with respect to the plane of the arms, so that rubber bumpers 75 and 75' may be attached to the channel adjacent its ends, as by bolts 76 which are recessed in the bumpers and may serve as a rest or support for the back 24 of the cage or basket C when the boom and baskets are in storage position, as in FIG. 1.

Figure 8:
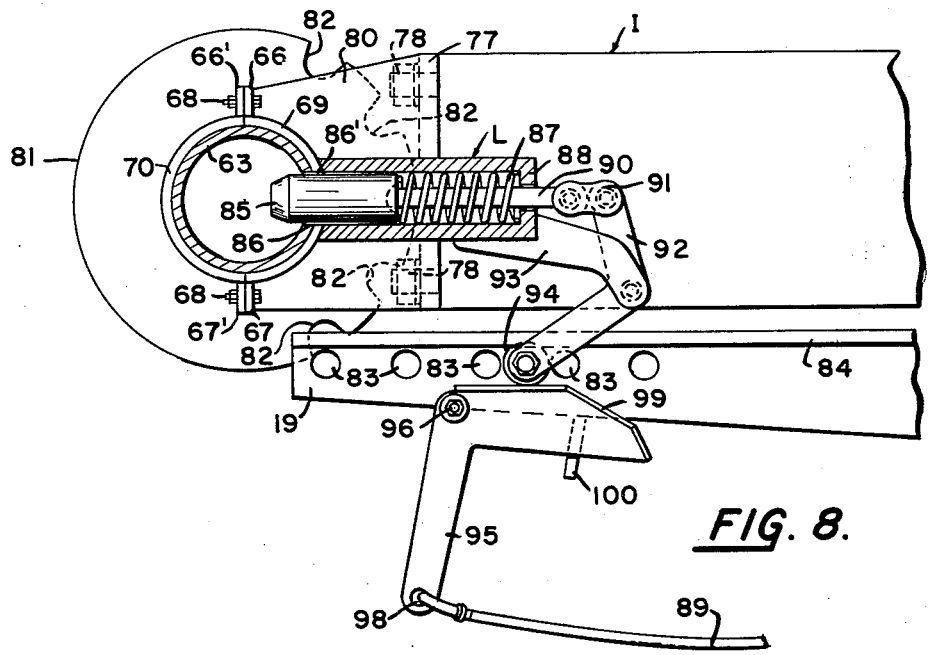
FIG. 8 is a fragmentary vertical section, taken along line 8—8 of FIG. 6, showing particularly a locking mechanism for the basket supporting assembly.

A U-shaped bracket 77 is attached to the outer end of inner boom I, as by bolts 78, with one forwardly extending leg 79 being welded to the rear surface of bearing plate 64 and the opposite leg 80 being welded to the rear surface of bearing plate 69. Upon retraction of inner boom I, a sprocket disc 81 which is fixed, as by welding, to the center of tube 63 and has a plurality of spaced slots 82 along the edge thereof adjacent inner boom I, will engage in succession a plurality of pins 83 extending between the walls of rack 19, as in FIG. 9, causing the sprocket disc and the yoke assembly Y, together with the cage or basket C, to be pivoted with the tube 63 to the position shown in full lines in FIG. 1, wherein the basket rests upon the bumpers 75 and 75' of FIG. 6. As in FIG. 8, as inner boom I is retracted, the lowermost slot 82 engages the outermost pin 83 and then the next slot engages the second pin, and so on, until the inner boom is fully retracted. As is evident, the sprocket disc 81 and tube 63 will be pivoted due to the engagement of pins 83 with successive slots 82 until the basket assumes the position shown in full lines in FIG. 1. When the inner boom is retracted, the cage or basket cannot be pivoted. However, until a lock L is manually released, so that the cage cannot be tipped to storage position with the workman still in it. Thus, the inner boom I can be moved inwardly only until the outermost pin 83 engages the first slot 82, as in FIG. 8, but after lock L is released, the inner boom I can be fully retracted. Rack 19 is channel shaped and is conveniently provided with laterally extending flanges 85 for attachment to the underside of the outer end of boom B.

The lock L normally maintains yoke assembly Y in fixed position when the basket or cage is in use. As is FIG. 8, lock L includes a latch pin 85 which normally engages holes 86 and 86' in the tube 63 and bearing plate 69, respectively, and is normally biased toward these holes by a coil spring 87, the spring and latch pin being enclosed in a tubular housing 88. The latch pin 85 is retracted by a pull cord 89 through a linkage system which comprises rod 90, extending through the rear end of the housing 88 and having one end connected to the rear of the latch pin 85 and the other end pivotally connected to a link 91 which in turn is pivotally connected to an angular link 92. A bracket 193 is attached to housing 88, as by welding, and pivotally supports link 92 intermediate its ends, while the lower end of angular link 92 is provided with a can engaging roller 94. An operating lever 195 is pivotally attached to rack 19 by a pin 96 mounted on a bracket 97, which extends laterally from rack 19, and is conveniently operated by pull cord 89 which is attached to the depending end of operating lever 95 at an aperature 98. A cam plate 99 which is conviently integral with lever 95, normally extends horizontally and then downwardly along the side of rack 19. As in FIG. 8, the operator merely pulls the pull cord 89 which causes lever 95 to pivot in a counterclockwise direction, causing cam plate 99 to be moved upwardly. As this happens, roller 94 is moved upwardly by cam plate 99, which in turn causes link 92 to pivot in a clockwise direction, retracting rod 90 as well as latch pin 85, so that yoke assembly Y may be free to pivot. A stop 100, which prevents lever 95 from being moved too far, also extends laterally from rack 19. As in FIGS. 6 and 9, the inner bearing plates 64 and 69 extend outwardly beyond the outer bearing plates 65 and 70, respectively, so that a pair of angles 101, attached to the lower portion of tube 63, as by welding, will engage the ends of the inner bearing plates when the yoke assembly is pivoted to storage position, thereby serving as abutments to prevent the yoke assembly from turning too far. If the operator fails to pull the pull core 89 to retract latch pin 85 before the first slot 82 of sprocket disc engages the first pin 83, an overload switch for the hydraulic cylinder operating the inner boom mechanism immediately stops the boom until the latch has been pulled.

As is FIGS. 10, 11 and 12, a remote control unit R is provided so that the derrick may be operated by the workman in the basket. The unit consists of three controls, the first of which causes the derrick turret 12 to rotate, moving the basket to the left or right; the second of which causes the hydraulic cylinder 15 to be extended or retracted, causing the basket to be raised or lowered; and the third of which causes the inner boom to be extended or retracted, causing the basket to move outwardly from the vehicle or inwardly toward the vehicle. The remote control unit includes three operating handles 105, 106 and 107, each of which is accessible from the basket and is provided at its inner end with a collar 108 attached, as by a set screw, to a tube 109. As in FIGS. 10 and 12, handle 105 extends upwardly, handle 106 extends to the left, while handle 107 extends to the right. Each tube 109 extends over a rod 110 and each rod 110 is pivoted at its inner end, through a bearing collar 111, on a pin 112, to accommodate pivotal movement of the basket. A bracket 113 is attached to the upper rear edge of the basket or cage C and is provided with four rearwardly extending flanges 114, through which pivot pin 117 extends to pivotally support bearing collar 111. Attached to the upper end of each tube 109 is a universal joint 115, which in turn is connected to an angular arm 116 of a preferably rectangular control rod 117, adapted to slide longitudinally within a larger, rectangular control rod 118, to accommodate extension and retraction of inner boom I. This arrangement provides sufficient space between the outer ends of the arms 116 so that the control rods 117 may be pivoted without arms 116 hitting each other, if operated independently or in sequence. Control rods 117 and 118 are merely pivoted slightly in open rectangular brackets 119 and 120, the former being mounted atop inner boom I and the latter atop outer boom B. At the inner end of boom B, the inner ends of control rods 118 are provided with links 121, 122 and 123, which correspond to handles 105, 106 and 107, respectively, and which respectively operate control valves 124, 125 and 126 of a valve assembly 127 which serves to operate the various hydraulic valves. Valve assembly 127 is connected by an inlet hose 128 with a source of hydraulic fluid under pressure and with outlets 129 to which hoses are attached for supplying fluid to and receiving fluid from the respective actuating cylinders or fluid motors. It will be understood that other connections may be made to the valve assembly 124, so that the basket may also be operated by a person standing on the ground.

Figure 13:
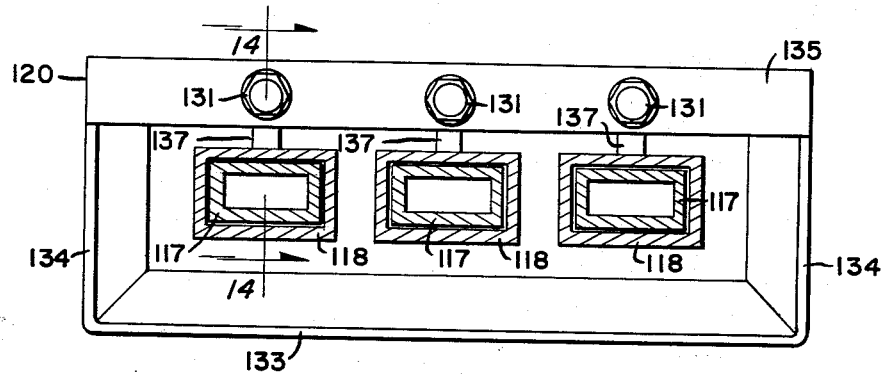
FIG. 13 is a vertical section, on an enlarged scale, taken along line 13—13 of FIG. 11.
Figure 14:
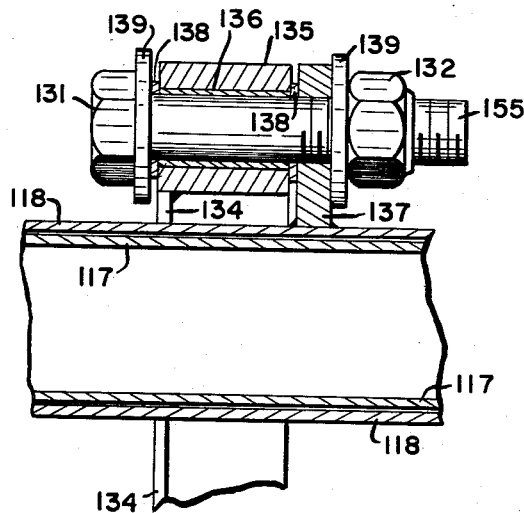
FIG. 14 is a fragmentary vertical section, on a further enlarged scale and taken transverse to FIG. 13 along line 14—14 of FIG. 13.

The control rods 117 and 118 are pivotally supported by supporting brackets 119 and 120 attached to the inner and outer boom, respectively, as indicated above. Bracket 119 is similar to brackets 120, except for a reinforcing angle 130 at each side of the former. As in FIG. 13, the control rods 118 are supported in each bracket 120 for pivotal movement about pivot pins 131, which are essentially bolts held in place by nuts 132. Each supporting bracket 120 is a rectangular open frame, conveniently formed from a bottom angle 133, a pair of side angles 134 and a rectangular block 135 across the top, all conveniently welded together and with pivot pins 131 extending through block 135. A bearing sleeve 136 is disposed in each of three holes in upper block 135 and surrounds the corresponding pivot pin, to support each of the operating rods. Each rod 118 is supported from pin 131 by a bar 137 having an upper hole through which pin 131 extends and attached at its lower end to rod 118, conveniently by welding. Washers 138 are provided on either side of the block 135 to minimize friction, while a conventional washer 139 may be placed between one thrust washer 138 and the bolt head of pin 131 and between nut 132 and bar 137, respectively. As will be evident, pivotal movement of any one of handles 105, 106 or 107 will cause a corresponding rotation of a control arm 118, which in turn will produce movement of the link connected at the end of the operating rod, which in turn opens or closes the corresponding valve to obtain the desired movement of the basket. Thus, movement of the left handle 106, as viewed from the basket, in an upward direction will cause the hydraulic cylinder which operates inner boom I to move the boom in an outward or extending direction, while a downward movement of the handle 106 will cause the inner boom and the basket to be retracted. Similarly, movement of handle 105 to the right will cause turret 12 to rotate so the basket moves to the right, as viewed by the workman in the basket, and movement of the handle 105 to the left causes the turret to rotate the derrick to the left. Likewise, movement of handle 107 in a downward direction causes cylinder 15 to retract, causing boom B and thus the basket to be lowered, while upward movement of the handle 107 causes cylinder 15 to be extended and the boom to be raised. Other operating handles may be conveniently provided on the vehicle so that the basket also may be operated from the ground.

Figure 15:
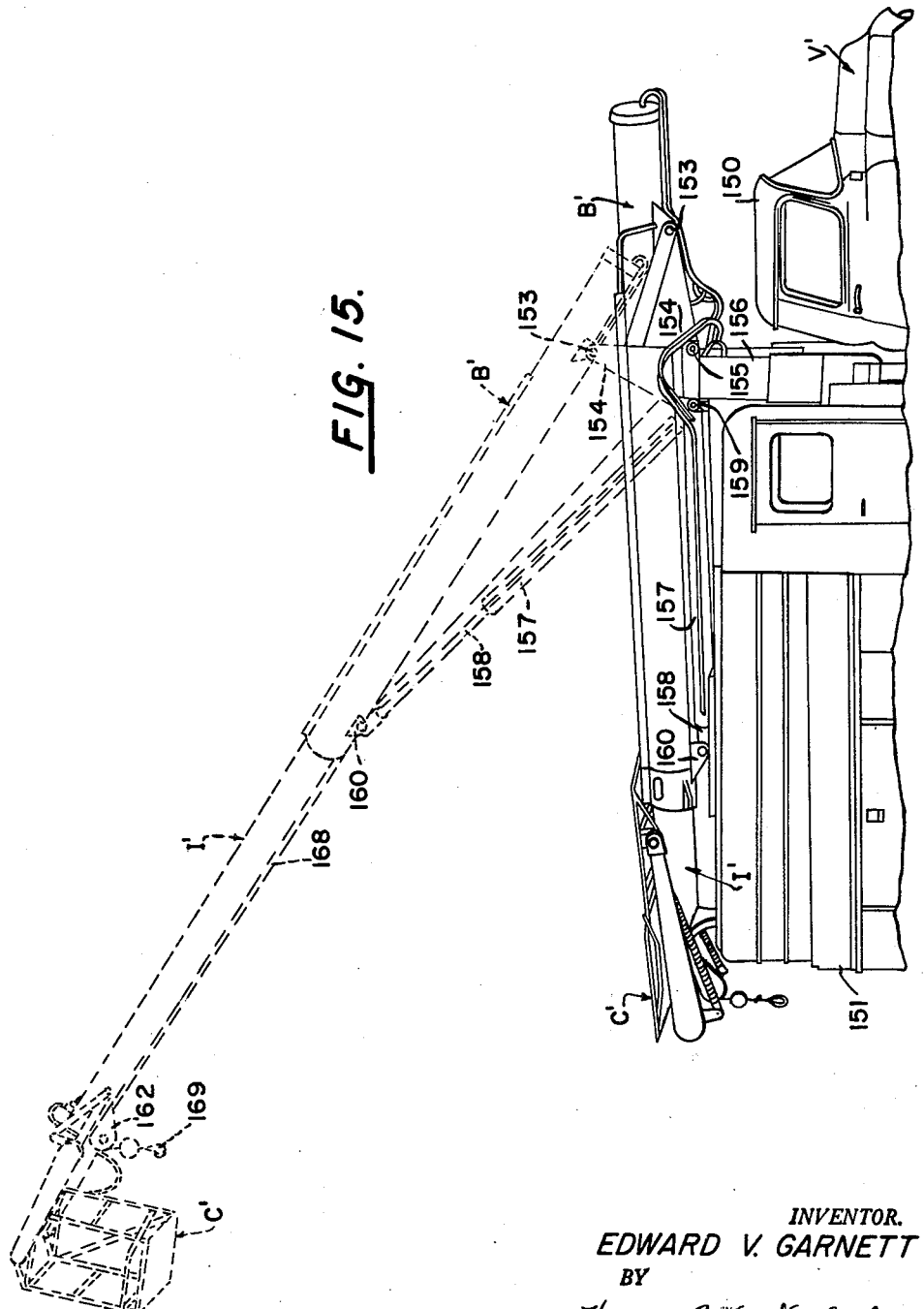
FIG. 15 is a side elevation of a truck similar to FIG. 1, equipped with an alternative form of derrick and aerial basket of this invention, the frame and basket being shown in collapsed or storage position in full lines and in open or use position in dotted lines.

As illustrated in FIG. 15, an alternative form of workman's basket or cage C' may be mounted on a vehicle V', such as a truck having a cab 150 and a panel body 151. The derrick includes a boom B', shown in storage position in full lines atop the vehicle and the outer end of which rests upon a supporting bracket 152, mounted on the rear of the panel body 151. Adjacent its inner end, the boom is pivotally attached at a pin 153 to a triangular bracket lever 154, which in turn is pivotally mounted at a pin 155 on the upper end of a turret 156, which preferably has a minimum depth, so as to occupy the least amount of space possible between cab 150 and panel body 151. Turret 156 houses a number of parts, such as an oil reservoir, a pump, bearing blocks and others and may be constructed in the manner disclosed in my copending application Ser. No. 731,485. The outer end of an inner boom I' may be provided with a workman's cage or platform C', shown in closed position in full lines and in extended or use position in dotted lines, the cage or platform being detachable and the boom also being capable of being utilized for hoisting purposes with cage C' in folded position. The boom may be connected with turret 156 by a hydraulic cylinder 157 having a piston rod 158, the cylinder 157 being pivoted on the turret by a pin 159 and the piston rod 158 being pivotally connected to the boom B' at a bracket 160, so that the boom may be raised and lowered to any desired angular position. As will be evident, with the boom B′ in storage position shown in full lines, when the piston rod 158 of hydraulic cylinder 157 is extended, the bracket lever 154 will pivot on pin 155 from the storage position to the "up" position, shown in dotted lines, so as to place the pivot axis of the boom B, at pin 158, more directly above turret 156. The bracket lever 154 is conveniently locked in the position shown in dotted lines for use of the derrick, as in the manner disclosed in my aforesaid application Ser. No. 731,485. As in FIG. 16, the inner boom I′ may be provided at its outer end with a pair of sheave brackets 162 within which a sheave 163 for a hoisting cable may be journalled on a tubular shaft 164, conveniently locked in position, as by a cotter pin as shown, to one of a pair of collars 165 which are attached to and extend outwardly from each bracket 162. Each collar 165 may be reinforced by a gusset 166 while a guide bolt 167 for the hoisting cable may extend between brackets 168 at the outer ends thereof. When the cage C′ is in storage position, a cable 168 of FIG. 15 having a hook 169 at the outer end, may be used for hoisting loads. However, the cable 168 may merely extend along the underside of booms B′ and I′ with hook 169 pulled up to the sheave, as shown, when the cage C′ is being used.

Figures 16, 17:
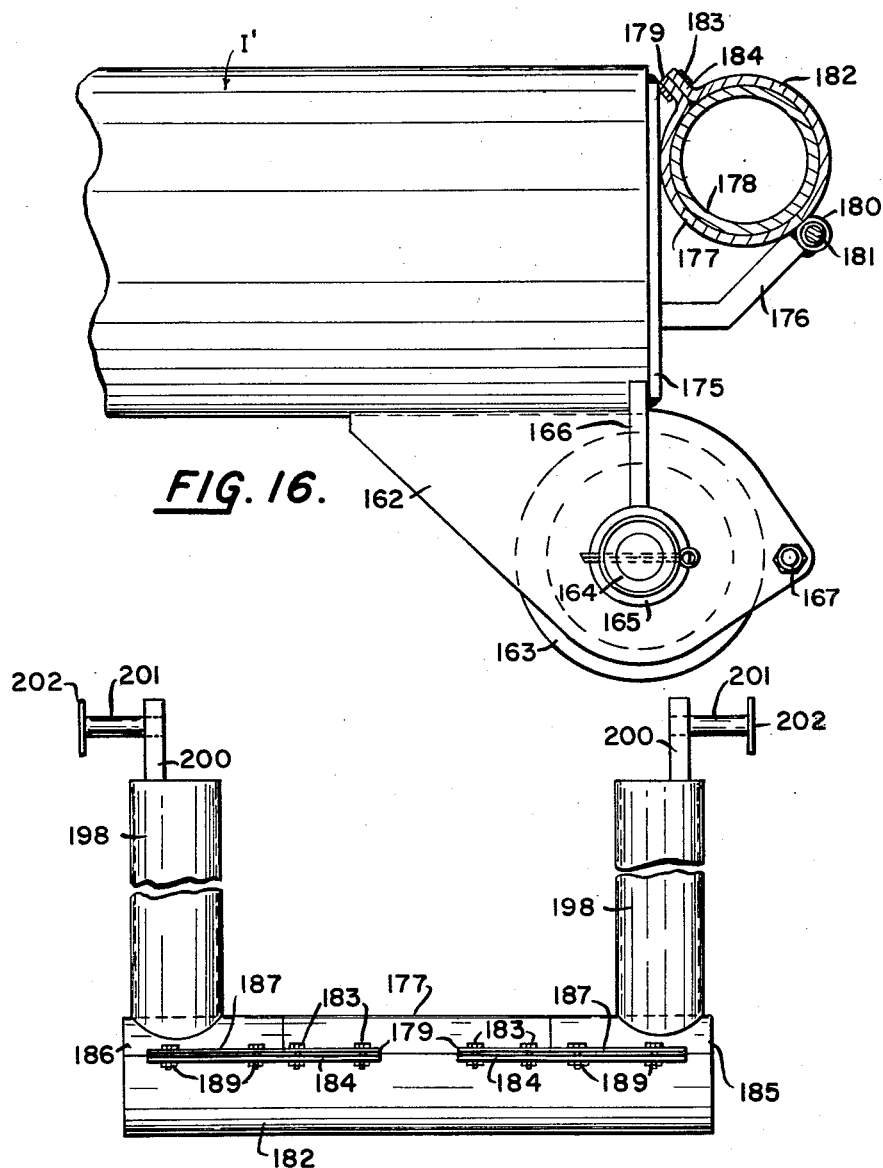
FIG. 16 is an enlarged side elevation of the front of an inner boom assembly of the derrick of FIG. 15.
FIG. 17 is a condensed top plan view of a supporting assembly which supports the workman's cage or basket of FIG. 15.

The outer end of inner boom I′, as in FIG. 16, may be closed by a circular plate 175 which may be welded thereto and on which may be mounted, as by welding, an arm 176 to which may be attached the lower half 177 of a clamp which forms part of a supporting assembly for a tubular mounting shaft 178 for the workman's cage or basket C′. A flange 179 at the opposite edge of clamp lower half 177 may be attached, as by welding, to plate 175, while the upper half 180 of the clamp may be pivoted to the lower half, at the lower edges thereof, by a hinge collar 180 and a hinge pin 181 extending therethrough, alternate hinge collars 180 being attached, as by welding, to the bracket arm 176 and the remaining collars being attached, as by welding, to the upper half 182 of the clamp. The halves 178 and 182 of the clamp may be removably attached together, as by bolts 183 extending through flange 184 of half 182 and also through flange 179, as shown also in FIG. 17, so that the upper half 182 of the clamp may be disconnected and the shaft 178, which may form part of a yoke Y′ for the workman's cage or basket, as shown in FIG. 21, may be removed along with the workman's cage C′ from the supporting assembly, when desired.

The workman's cage or basket C′ may be supported by the shaft 178 of FIG. 16, with which may be associated the yoke Y′ of FIG. 21 and a supporting assembly which may, as in FIG. 17, include a pair of semicircular brackets 185 and 186, disposed adjacent opposite ends of the shaft 178 and adapted to engage the shaft at each side of the lower half 177 of FIG. 16. The upper clamp half 182 of FIG. 16 may extend the full distance opposite the bracket 185, lower clamp half 183 and bracket 186, while each bracket 185 and 186 may be provided with a flange 187, as shown also in FIG. 17, and clamp half 182 may be provided with lower flanges 188 opposite brackets 185 and 186, as in FIG. 18, by which the clamp half 182 may be removably attached thereto, as by bolts 189, On each bracket 185 and 186 may be mounted a tubular arm 198 extending generally radially therefrom, rearwardly along and generally parallel to inner boom I′ of FIG. 16, while each arm 198 may be provided at its outer end, as in FIG. 18, with a circular cap 199, adapted to support a bracket 200 provided with a pin 201, engaged by a spring for a purpose described later and provided with an end flange 202 to insure that the spring does not slip off the pin. The arms 198 are conveniently welded to brackets 185 and 186, while pins 199 and brackets 200 are also conveniently attached to the respective parts by welding. A workman's cage or basket C′ is attached to the opposite ends of shaft 178, in a manner described later, but provision is made to lock shaft 178 in position and also to permit shaft 178 to be turned to different positions within the clamps 177 and 182 and brackets 185 and 186. For this purpose, as shown in FIGS. 18 to 20, one of the arms 198, such as the arm attached to bracket 185, may be provided with a right angled slot 203, through which extends a handle 204 of a rod 205, provided at its opposite end with a plug or stop 206. The latter extends through a hole 207 in bracket 185 and also through a hole 208 in shaft 178, as in FIG. 20, when the cage C′ is in the use position, such as shown in dotted lines in FIG. 15, and is adapted to extend through a diametrically opposite hole in shaft 178 when cage C′ is in storage position, shown in full lines in FIG. 15. Plug 206 and rod 205 may extend longitudinally within a housing 209 provided with an end cap 210, through which rod 205 also extends, with a compression spring 211 bearing between the end of plug 206 and cap 210 to press plug 206 inwardly and maintain it within the desired hole in shaft 178. When cage C′ is to be moved from use to storage position, or vice versa, handle 204 of rod 205 can be moved from the position of FIG. 19 to the right angles portion of slot 203, which will cause plug 206 to be withdrawn from hole 208 or the corresponding hole on the opposite side of shaft 178, whereupon cage C′ can be moved through 180° or any other appropriate angle. As soon as cage C′ has reached the desired position, handle 204 may merely be shifted to the longitudinal portion of slot 203, whereupon spring 211 will move plug 206 into the desired hole.

Workman's cage C′, as illustrated in FIGS. 19, 20 and 21, may be supported by a yoke Y′ which includes a pair of tapered arms 215 connected, as by brackets or caps 216, at their inner ends to the opposite ends of shaft 178, the latter being shown also in FIG. 16. Outside the opposite ends of the upper clamp 182, shaft 178 may be provided with arms 217 and 218, respectively, as in FIGS. 21 and 22, conveniently welded to the shaft and in alignment with the respective pins 201 so that a spring 219 may be attached at one end to pin 201 and the opposite end to the respective arm 217 or 218. The springs 219 tend to move the cage and particularly shaft 178 from either the storage or use position, to an intermediate position, thus assisting the operator in shifting the cage from one position to the other. It will be noted that the storage and use positions of arms 215, of yoke Y are conveniently disposed at 180° to each other. When not needed, the workman's cage or basket may be removed from the boom, as by detaching the upper clamp half 182 of FIG. 16 from the lower clamp half 177 and brackets 185 and 186, as with the workman's cage in extended position and resting on the ground. When so detached, the entire workman's cage C′ and the yoke Y′ may be lifted by the cable shown in FIG. 15 and placed in the body of the vehicle, or at any other desired location.

Arms 215 are conveniently made of plywood with a fibreglass and resin cover, or may be made of any other suitable material, to which inner brackets or clamps 216 may be attached, as by bolts 220, and an outer cap 221 attached at the opposite end, as by bolts 222. Each cap 221 may be provided with a bearing for a pin 223, for pivotal movement of the cage, each pin 223 extending outwardly from a mounting block 224 through a spacing collar 225. A washer 226 may be provided on each pin 223, outside cap 221, with a cotter pin or similar device exteriorly thereof. Each mounting block 224 may be disposed at one side of a rectangular upper frame 227 conveniently formed of tubular members attached solidly together, as by welding, while at each side a reinforcing strut 228, conveniently tubular, may be welded at its opposite ends to the upper frame 227 and extend over mounting block 224, as in FIG. 22. A solid rectangular lower frame 229, also conveniently formed of tubular members, may be provided with a perforated floor 230, as indicated in FIG. 21. The upper and lower frames may be connected at the front and rear by pairs of vertical struts 231 and 232, conveniently also tubular and reinforced by cross bars 233, as in FIG. 23. The upper and lower end of each strut 231 and 232 may be attached, as by welding, to a sleeve 234 which respectively pivots on a front or rear member of the upper and lower frames 227 and 229. When in extended or use position, the upper and lower frames may be held apart by an angle brace at one side, conveniently comprising tubes 235 and 236 of different diameters, so as to be slidable one within the other, and respectively pivotally attached to the upper and lower frames, as by pivotal connection at the respective upper and lower brackets 237 and 238, each of which is conveniently formed so that a pivot pin 239 may extend therethrough. The construction may be further reinforced by a bar 240 at each side, which may be removably attached, as by bolts, to the respective upright struts 231 and 232.

A locking device may be mounted at a hole 241 in tube 235, tube 236 being provided with a hole which coincides with hole 241 and engaged by the locking device when the cage is in extended or use position, and also with another hole, at the upper end of tube 236, for engagement by the locking device in storage position. When the side bars 240 are removed and the tube 236 is pulled outwardly from tube 235, the lower bracket 238 can be pivoted in a crosswise direction, as in FIG. 22, and moved to a position rearwardly of the upper bracket 237. For folding to storage position, locking plug 206 of FIGS. 18–20 is disengaged, in the manner previously described, and shaft 178, together with yoke Y', are pivoted around until arms 215 lie above the outer end of the inner boom assembly I', as in FIG. 15, so that the upper frame 227 and lower frame 229 will assume the position shown, with struts 231 and 232 still connecting the same. In such position, the locking plug 206 of FIGS. 18–20 will engage an appropriate hole in shaft 178, thus securing the cage in storage position.

The locking device associated with hole 241 in tube 235 of FIG. 22 may be constructed in any suitable manner, such as illustrated in FIG. 24 or FIG. 25. Thus, as in FIG. 24, a locking bolt 245 may be provided with a handle 247 at its outer end and a flange 248 spaced from its inner end, conveniently formed by a washer welded thereto and adapted to bear against a spring 249. The opposite end of spring 249 bears against an outer end cap 250 of a tubular housing 251, the latter also being conveniently provided with an inner end cap 252 and conveniently welded to tube 235, with cap 250 also being conveniently welded to the housing while spring 249 is compressed, so that a lock bolt assembly may be formed prior to attachment to the outside of tube 235 around hole 241, as by welding. As will be evident, spring 249 will maintain lock bolt 245 in engagement with holes 241 and 246 unless it is pulled outwardly by handle 247.

In the alternative locking device illustrated in FIG. 25, a pin 255 may be provided at its outer end with a transverse handle 256, conveniently formed merely by bending the end of the pin around, and at its inner end with a cylindrical block 257, adapted to engage hole 241 and 246 of FIG. 24. A spring 258 bears against block 257 at one end and at the opposite end against an end cap 259 of a tubular housing 260, the inner end of which may be welded to tube 235 of FIG. 22 around hole 241. An inner end cap for housing 260 is unnecessary, since handle 256 forms a stop for pin 255 and also extends laterally from housing 260, so that it may be readily grasped. When the locking device of FIG. 25 is being assembled, the pin 255 may be inserted through the end cap 259, previously attached to housing 260, the spring 258 inserted and block 257 inserted over the inner end of pin 255 and clamped, so that the spring will be held in compression while pin 255 is welded to block 257, at the inner end thereof. As will be evident, any other suitable type of locking device may be used.

It may sometimes be desirable to prevent the cage or basket C' from swinging, but at other times permit the cage to swing so as to remain in an upright position. For this purpose, the braking pivot of FIG. 26, with which may be associated the wing nut of FIG. 27, may be used. As in FIG. 26, a modified mounting block 224' may be provided with a pin 223' having threads 263 at its outer end. Block 224', as before, may be mounted between upper frame 227 and reinforcing strut 228, but may be additionally reinforced by plates 264, on the inside or outside, or both, as shown. Block 224' may also be provided with an outer flange 265 to which is attached a friction disc 266 of suitable material, such as normally used for brakes. In this instance, collar 225 of FIG. 21 may be omitted while the smooth portion of pin 223' engages the bearing carried by the inner cap 221 for the respective arm 215, or the collar 225 of FIG. 21 may be attached to cap 221 and a bearing for pin 223' extend therewithin. Thus, the friction disc 266 will engage the inner surface of cap 221, or the inner surface of collar 225 when affixed to the cap, which surface may be forced against the friction disc by tightening a nut 268 of FIG. 27 on the threads 263 of pin 223', nut 268 being tightened against the outside of cap 221, such as against washer 226 of FIG. 21. For readier adjustment of nut 268, an angular handle 269 may be welded to each of the opposite sides thereof, with a flat reinforcing strip 270 welded to each opposite side of the nut and the respective handle. As will be evident, nut 268 may be adjusted to provide considerable friction when the cage tends to swing, as when the workman wishes a solid support to work from, but may be loosened to permit the carriage to shift and remain upright when the cage is being moved to a different position.

From the foregoing, it will be evident that a workman's cage or basket constructed in accordance with this invention fulfills to a marked degree the requirements and objects hereinbefore set forth. The workman's cage may be easily removed from the yoke assembly by removing the tensioning nut on each side of the basket and withdrawing the pivot pins. The workman's cage or basket, in one form of the invention, is collapsible, may be stored atop the boom and thus permits the boom to be used for hoisting purposes while the workman's cage is in storage position, but the cage is readily available for use when necessary. The collapsible cage is also particularly of advantage, since in storage position it will occupy a minimum of space and can lie flat atop the boom. Also, the cage may be readily removed from the boom when a considerable amount of hoisting is to be done and use of the cage is unnecessary. Also, the provision of controls for operating the derrick which may be provided with either embodiment of the workman's cage or basket, and may be operated from the basket, enable the workman, by pushing any one of three levers, to move the basket in any direction desired. The controls are easy to reach from the basket and are simple to use, additional controls also being readily provided so that the basket may be controlled from the ground, when desired. The controls to operate the basket are constructed in such a way that they are retractible and extendible with the boom as it is extended or retracted. A novel retraction means for moving the basket to storage position has been provided, which is operated by retraction of the inner boom. Means are provided on the collapsible basket so that it may be adjusted to any one of a number of positions.

Although certain specific embodiments of a workman's cage or basket have been illustrated and described herein and a specific embodiment of a remote control system to be used with the cage or basket has been illustrated and described, it will be understood that other embodiments of

What is claimed is:

1. An extensible boom assembly adapted to be mounted on a vehicle and including an outer boom; an inner boom telescopically received in said outer boom; a pair of arms, each having one end pivotally connected to said inner boom adjacent the outer end thereof; and a workman's basket pivotally mounted on the other end of the said arms for movement between a use position outwardly of said inner boom and a storage position above said inner boom.

2. A boom assembly as set forth in claim 1, and remote controls for operating said derrick from said basket including a bracket mounted on said basket; at least one telescopic operating handle extending from said bracket to a point adjacent said inner boom; an angular arm; a universal joint connecting said control handle and said angular arm; telescopic control rods attached to each said boom, said angular arm being connected to the control rod on said inner boom; a hydraulic valve assembly; and means operatively connecting the control rod on said outer boom to said valve assembly.

3. A boom assembly, as set forth in claim 1, including a transverse shaft pivotally mounted on the outer end of said inner boom, said other end of said arms being fixedly attached to said transverse shaft for rotation therewith to move said basket between said use position and said storage position.

4. A boom assembly, as set forth in claim 3, including means to lock said shaft with said basket in either said use position or in said storage position.

5. A boom assembly, as set forth in claim 4, including stop means operatively associated with said one end of one of said arms for selectively limiting pivotal movement of said basket with respect to said arms.

6. A workman's cage or basket assembly adapted to be mounted on a boom of a derrick adapted to be mounted on a vehicle, comprising a support extending outwardly from the outer end of said boom; a yoke having a shaft with arms extending from each end thereof, said shaft being pivotally connected to said support; a workman's basket pivotally attached to the outer ends of said arms, said yoke and said basket being adapted to be swung between a use position outwardly of said boom and a storage position above said boom; locking means to prevent rotation of said yoke; and means for limiting pivotal movement of said basket on said yoke arms.

7. A cage or basket assembly, as set forth in claim 6, including generally semicircular bearing plates pivotally mounting said yoke on said supports; a pair of arms extending from said bearing plates along the sides of said inner boom and terminating in outwardly extending pins; a pair of spaced brackets on said yoke shaft corresponding to said pins; and a spring interconnecting each said pin with a corresponding bracket, said springs assisting the operator when moving said basket between said storage position and said work position.

8. A cage or basket assembly, as set forth in claim 6, wherein said stop means includes a threaded pin extending outwardly through said yoke arm; a brake lining attached to said pin; and means adapted to be threadably received on said pin for clamping said yoke arm against said brake lining to prevent pivotal movement of said basket about said yoke.

9. A cage or basket assembly, as set forth in claim 6, wherein said locking means includes a lock pin slidably mounted within one of said bearing plate arms; an angular slot in said arm; and a handle extending from said locking pin and through said slot for operating said locking pin.

10. A cage or basket assembly, as set forth in claim 6, including means for locking said yoke in either said use position or said storage position.

11. A cage or basket assembly, as set forth in claim 10, including bearing plates for said shaft; and wherein said locking means includes a locking pin adapted to extend through a hole in one of said bearing plates and said yoke shaft; a housing mounted on said one bearing plate for containing said locking pin; a spring within said housing normally urging said locking pin into said holes; and a linkage mechanism connected to said locking pin for retracting said locking pin from said holes to permit said yoke to pivot.

12. A cage or basket assembly, as set forth in claim 11, wherein said linkage mechanism includes a rod extending from said locking pin through said housing; a support arm extending from said housing; an angular link pivoted intermediate its ends to said support arm; and means connecting an end of said support arm to said rod, said roller being connected to the other end of said angular link.

13. A cage or basket assembly, as set forth in claim 6, wherein said basket is collapsible.

14. A cage or basket assembly, as set forth in claim 13, wherein said basket includes a generally rectangular upper frame; a generally rectangular lower frame; vertical struts pivotally interconnecting said upper frame and said lower frame; a diagonal telescopic strut extending from said lower frame to said upper frame; and a latch pin for locking said diagonal strut in adjusted position.

15. A cage or basket assembly, as set forth in claim 14, including a housing for said latch pin attached to said diagonal strut, with corresponding holes in the telescopic sections of said strut through which said latch pin extends; a spring within said housing urging said latch pin into said holes; and a handle attached to said latch pin and extending through said housing for operating said latch pin.

16. A cage or basket assembly, as set forth in claim 15, including a stop plate between said latch pin and said handle within said housing for limiting the inward movement of said latch pin.

17. A cage or basket assembly, as set forth in claim 15, wherein the portion of said handle outwardly of said housing is bent over preventing inward movement of said latch pin beyond a predetermined point.

18. A boom assembly, including an outer boom; an inner boom telescopically received in said outer boom; a workman's cage or basket; means for mounting said basket on the outer end of said inner boom for pivotal movement between a use position outwardly from said boom and a storage position atop said boom; a rack mounted adjacent the outer end of said inner boom but extending outwardly beyond said outer end of said inner boom when said inner boom is retracted; and means carried by said basket mounting means for engaging said rack as said inner boom is retracted or extended to move said basket from said use position to said storage position and vice versa.

19. A boom assembly, as set forth in claim 18, including a cam lever pivotally mounted on said rack adjacent the end thereof; a roller on said basket mounting means engaging the cam surface of said cam lever; and means for pivoting said cam lever against the force exerted by said roller to operate said linkage mechanism, thereby retracting said locking pin.

20. A boom assembly, as set forth in claim 18, including a yoke supporting said basket; a shaft for said yoke; spaced bearing plates for said shaft; a disc mounted on said yoke shaft between said bearing plates and having notches around at least a portion of the periphery thereof; and transverse pins carried by said rack and adapted to be engaged by said notches of said disc, thereby rotating said disc and said yoke when said inner boom is retracted or extended to cause said basket to be pivoted to said work position when said inner boom is extended and to said storage position when said inner boom is retracted.

21. A remote control assembly for a workman's basket mounted on a derrick boom and having at least one control unit including a rod pivoted on said basket; an operating tube telescopically mounted on said rod; a handle extending outwardly from said tube for turning said tube on said handle; a control tube extending longitudinally along said boom and provided with an angular arm; and a universal joint connecting said operating tube with said arm.

22. A remote control assembly as set forth in claim 21, including a plurality of control units connected to said basket, with the normal position of the handles thereof being in different directions.

23. A remote control assembly, as set forth in claim 21, wherein said derrick includes telescoping booms and said control rods are telescopic and supported by brackets mounted on said booms.

24. A remote control assembly, as set forth in claim 23, including non-circular telescopic control tubes; means including a hydraulic assembly for operating said derrick; and a link connected between said valve assembly and said control tube at the inner end of said derrick.

25. A remote control assembly, as set forth in claim 24, wherein said noncircular control tubes are rectangular and said brackets are generally rectangular with open centers through which said control tubes extend; a pivot arm in each said bracket for supporting a control tube; a bearing at the upper edge of each bracket; and a pivot pin extending through said bearing for supporting said pivot arm.

References Cited by the Examiner

UNITED STATES PATENTS

| | | | |
|---|---|---|---|
| 534,608 | 2/95 | Leonhardt | 182—2 |
| 2,304,443 | 12/42 | Butler | 182—2 |
| 2,936,848 | 5/60 | Hall | 182—2 |

FOREIGN PATENTS

| | | |
|---|---|---|
| 746,283 | 3/56 | Great Britain. |
| 550,896 | 11/56 | Italy. |

HARRISON R. MOSELEY, *Primary Examiner.*

G. LEO BREHM, *Examiner.*